US012059887B2

(12) United States Patent
Schmidt et al.

(10) Patent No.: US 12,059,887 B2
(45) Date of Patent: Aug. 13, 2024

(54) PRINTING PRESS

(71) Applicant: BOBST BIELEFELD GmbH, Bielefeld (DE)

(72) Inventors: Johannes Schmidt, Bielefeld (DE); Dieter Betzmeier, Untermeitingen (DE)

(73) Assignee: BOBST BIELEFELD GmbH, Bielefeld (DE)

( * ) Notice: Subject to any disclaimer, the term of this patent is extended or adjusted under 35 U.S.C. 154(b) by 47 days.

(21) Appl. No.: 17/296,518

(22) PCT Filed: Nov. 5, 2019

(86) PCT No.: PCT/EP2019/025381
§ 371 (c)(1),
(2) Date: May 24, 2021

(87) PCT Pub. No.: WO2020/108796
PCT Pub. Date: Jun. 4, 2020

(65) Prior Publication Data

US 2022/0024199 A1 Jan. 27, 2022

(30) Foreign Application Priority Data

Nov. 27, 2018 (EP) .................................... 18020619

(51) Int. Cl.
*B41F 13/42* (2006.01)
*B41F 33/00* (2006.01)

(52) U.S. Cl.
CPC .......... *B41F 13/42* (2013.01); *B41F 33/0018* (2013.01)

(58) Field of Classification Search
CPC ............................ B41F 13/42; B41F 33/0018
See application file for complete search history.

(56) References Cited

U.S. PATENT DOCUMENTS 3,098,436 A 7/1963 Hornberger
3,489,082 A 1/1970 Morris
4,557,191 A * 12/1985 Speicher .................... B25J 9/04 901/14
4,730,135 A 3/1988 Dolderer et al.
(Continued)

FOREIGN PATENT DOCUMENTS

CN 1079194 A 12/1993
CN 101090823 A 12/2007
(Continued)

OTHER PUBLICATIONS

International Search Report issued on Dec. 13, 2019, in International Patent Application No. PCT/EP2019/025381 (4 pages).
(Continued)

*Primary Examiner* — Matthew G Marini
*Assistant Examiner* — Leo T Hinze
(74) *Attorney, Agent, or Firm* — Bookoff McAndrews, PLLC

(57) ABSTRACT

A printing press (10) has at least one electric motor (14), which is arranged at a distance of less than 0.5 m from an emission source (18). At least one explosion protection wall (22) is provided, such that the thread measure (F) between the emission source (18) and the electric motor (14) is greater than 0.5 m.

20 Claims, 1 Drawing Sheet

(56) References Cited

U.S. PATENT DOCUMENTS

Figure 1:
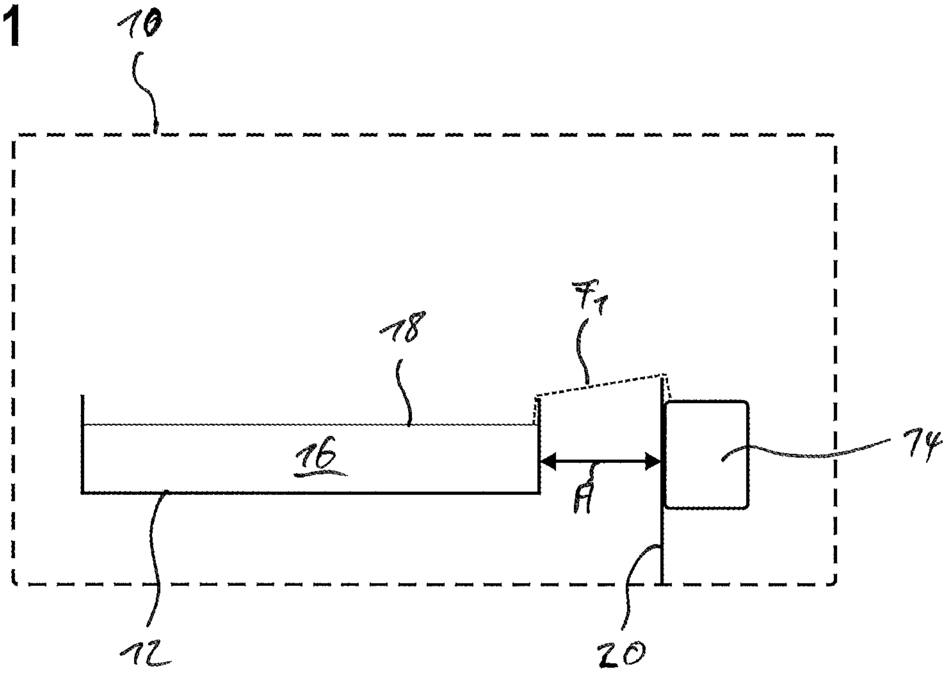

| | | | | |
|---|---|---|---|---|
| 4,852,486 | A * | 8/1989 | Ely | B41F 5/20 101/247 |
| 5,613,438 | A | 3/1997 | Rehberg | |
| 7,114,447 | B2 | 10/2006 | Xifra Boada et al. | |

FOREIGN PATENT DOCUMENTS

| | | | |
|---|---|---|---|
| CN | 101287604 | A | 10/2008 |
| CN | 103036345 | A | 4/2013 |
| CN | 104121940 | A | 10/2014 |
| CN | 104122300 | A | 10/2014 |
| CN | 104411611 | A | 3/2015 |
| CN | 204669135 | U | 9/2015 |
| CN | 105515258 | A | 4/2016 |
| CN | 205951491 | U | 2/2017 |
| CN | 206564087 | U | 10/2017 |
| CN | 108246160 | A | 7/2018 |
| CN | 108297537 | A | 7/2018 |
| CN | 208083051 | U | 11/2018 |
| DE | 1611204 | B1 | 5/1972 |
| DE | 60222706 | T2 | 11/2007 |
| DE | 202011002408 | U1 | 5/2012 |

OTHER PUBLICATIONS

"Explosion proof safety of electrical system in oil depot" Wang Xiang, Geng Guanghui, Aviation Oil Department of Xuzhou Air Force College, Article No. 1004-9118 (2005) 01-0001-04.

"Research and application of alcohol based fuel in forging furnace", Guo Yanchao, Li Jian, Shandong Minghua new materials Co., Ltd., Article No. 2096-3548 (2017) 09-0003-04.

* cited by examiner

PRINTING PRESS

CROSS-REFERENCE TO RELATED APPLICATION(S)

This application is a National Stage under 35 U.S.C. § 371 of International Application No. PCT/EP2019/025381, filed on Nov. 5, 2019, which claims priority to European Patent Application No. 18020619.5, filed on Nov. 27, 2018, the contents of all of which are incorporated by reference in their entirety.

BACKGROUND OF THE INVENTION

The invention relates to a printing press having at least one electric motor.

Printing presses with electric motors serving for the drive unit are known. In these printing presses, solvent-containing ink is normally used, so that there is a danger of the air becoming enriched with solvent vapor and being ignited by a spark in the electric motor.

In order to prevent such an explosion, it is known in the prior art how to employ special electric motors with explosion protection, so that there are no ignition sparks which might come into contact with the surrounding air. Furthermore, it is known how to evacuate the solvent-containing air at the emission source of the solvent vapors, so that no ignitable composition can be formed in the air. The drawback of these designs is that they are very expensive in their construction and therefore they are costly.

BRIEF SUMMARY OF THE INVENTION

The problem which the invention proposes to solve is to provide a printing press which has an economical explosion protection.

As the solution of the problem, a printing press is provided with at least one electric motor, which is arranged at a distance of less than 0.5 m from an emission source. Moreover, the printing press comprises at least one explosion protection wall, which is configured such that the minimum thread measure between the emission source and the electric motor is greater than 0.5 m.

In the sense of the invention, an emission source will mean a location at which solvent vapor is emitted, especially during the operation of the printing press, especially from fluid solvent-containing ink which is not yet fully dried. The location is formed in particular by a part of the printing press itself, where operating means such as material webs and printing ink are viewed in this context as being part of the printing press. For example, the emission source may be an anilox roller, a pressure cylinder, a chambered doctor blade bar, an ink tray or an imprinted web of material.

In the sense of the invention, the thread measure is the length of a thread stretched between two points, i.e., the shortest free path connecting two points to each other, skirting obstacles. By contrast, obstacles lying between two points are not considered in the case of their distance.

Thanks to the explosion protection wall, the minimum thread measure between the emission source and the electric motor is extended to at least 0.5 m. In this way, the minimum thread measure amounts to more than 0.5 m, which needs to be observed according to the safety regulations in order to safely rule out an explosion hazard. Thanks to the explosion protection wall, the printing press can have a very compact and economical design, since no expensive features are required for the explosion protection.

In one embodiment, the explosion protection wall is part of a labyrinth structure, which ensures that the minimum thread measure is greater than 0.5 m, even when the electric motor is arranged closer than 0.5 m to the emission source.

In another embodiment, the explosion protection wall is part of a housing open at one end. In this way, the thread measure from the electric motor can be determined, which is not the case with a fully enclosed housing, since the thread cannot be pulled through a fully enclosed housing. The open housing has the advantage that heat can be more easily dissipated from the electric motor in this way, which can prevent an overheating of the electric motor with less expense.

It is advantageous here for the housing to have an opening on the side with the electric motor, which is arranged opposite to the emission source. In this way, the thread measure is especially greatly lengthened through the housing, so that the electric motor can be arranged especially close to the emission source.

According to another embodiment, the printing press comprises a receptacle which is designed to hold solvent-containing ink up to a maximum level. The electric motor is arranged relative to the receptacle such that the minimum thread measure between the maximum level and the electric motor without the explosion protection wall is less than 0.5 m. At the same time, the explosion protection wall is designed such that the minimum thread measure between the maximum level and the electric motor with the explosion protection wall is greater than 0.5 m. The maximum level in particular forms the emission source here. Moreover, the maximum level takes account of any machine parts dipping into the ink, such as ink rolls, so that the required safety distance of 0.5 m is assured in the operation of the printing press.

In one embodiment, the receptacle is an ink box or an ink tray, which usually has a rather large amount of fluid solvent-containing ink and thus forms a major emission source during operation.

Preferably, the electric motor itself does not have an explosion-protected design, so that the printing press can have an especially economical design.

Figure 2:
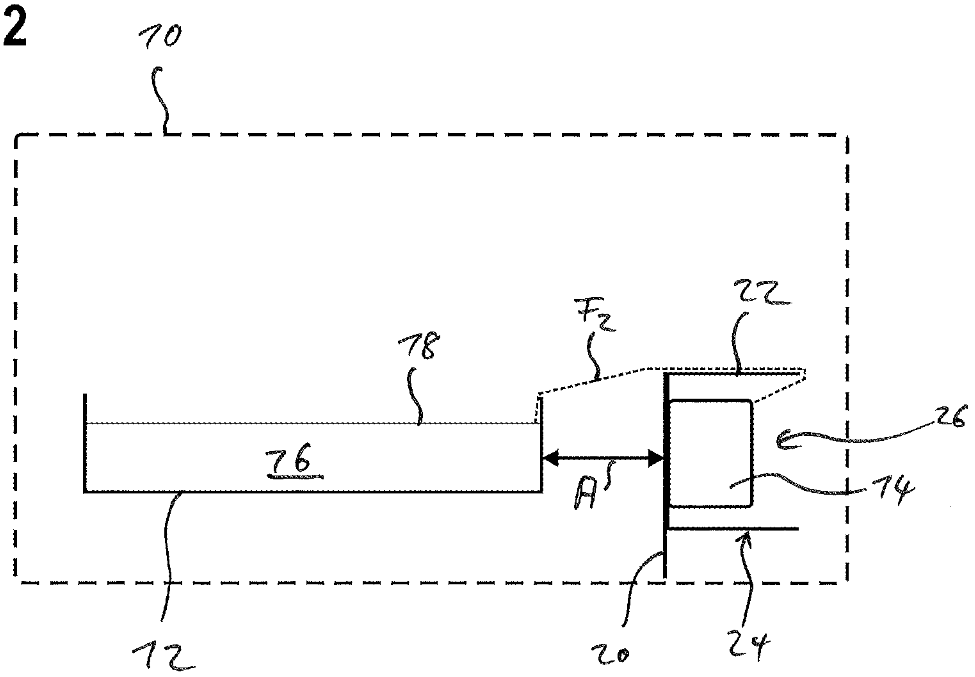

Further benefits and features will emerge from the following description, as well as the enclosed drawings. These show:

FIG. 1, in a schematic representation, a printing press according to the invention without an explosion protection wall, and FIG. 2, in a schematic representation, the printing press from FIG. 1 with an explosion protection wall.

DETAILED DESCRIPTION

FIG. 1 shows a printing press 10 comprising an ink box 12 and an electric motor 14.

In an alternative embodiment, the printing press 10 need not have an ink box 12.

The printing press 10 for example is a flexographic printing press or a gravure printing machine.

The ink box 12 is filled with fluid solvent-containing ink 16 up to a maximum level 18.

The electric motor 14 is fastened to a beam 20 of the printing press 10.

In the present embodiment, the electric motor 14 constitutes an adjustment drive unit of the printing press 10.

The distance A between the ink box 12 and the electric motor 14 is 0.25 m.

The thread measure $F_1$ between the maximum level 18 and the electric motor 14 is 0.4 m.

The distance between the maximum level 18 and the electric motor 14, disregarding the wall thickness of the ink box 12, is 0.25 m, similar to the distance A between the ink box 12 and the electric motor 14.

In order to make sure that the thread measure between the emission source, constituted here by the maximum level 18, and the electric motor 14 is at least the required 0.5 m, an explosion protection wall 22 is provided (see FIG. 2).

In an alternative embodiment, the emission source may be formed by any given location, especially one in or on the printing press 10, which has solvent-containing ink 16 which gives off solvent vapors to the surroundings during the operation of the printing press 10.

The explosion protection wall 22 is part of a housing 24 which encloses the electric motor 14.

The electric motor 14 here is arranged in the housing 24 and fastened along with it to the beam 20.

The housing 24 is cuboidal and has an opening 26, arranged opposite to the ink box 12 and thus opposite to the maximum level 18. Hence, the housing 24 has the shape of an open shoe box.

In particular, the housing 24 is entirely closed, apart from the opening 26, so that no solvent or solvent-containing air can pass through the housing 24. In other words, the housing 24 is tight.

The explosion protection wall 22 here is collar shaped and runs in the circumferential direction, enclosing the electric motor 14.

With the explosion protection wall 22, the minimum thread measure $F_2$ between the maximum level 18 and the electric motor 14 is 0.6 m.

In an alternative embodiment, the housing 24 and/or the explosion protection wall 22 can have basically any desired form, the geometry of the housing 24 and/or the explosion protection wall 22 ensuring that a sufficiently large thread measure F is ensured between the emission source and the electric motor 14.

In addition or alternatively, the explosion protection wall 22 may be part of a labyrinth structure which ensures that the thread measure F between the emission source and the electric motor 14 is greater than 0.5 m.

Of course, the printing press 10 is not confined to the exemplary embodiment shown in the figures. In particular, the distance A between the electric motor and the emission source may have any value between 0 and 0.5 m. Moreover, the minimum thread measure $F_2$ can have any value above 0.5 m.

Furthermore, the concept may be applied accordingly for protection distances other than 0.5 m.

In this way, the thread measure $F_1$ is extended by the explosion protection wall 22 to the thread measure $F_2$, which ensures that the electric motor 14 is located outside a range where an ignitable air mixture can form during the operation of the printing press. Thus, an explosion of the solvent can be safely ruled out.

This provides an economical printing press with an effective explosion protection.

The invention is not confined to the embodiment shown. In particular, individual features of one embodiment may be combined at will with features of other embodiments, in particular independently of the other features of the corresponding embodiments.

The invention claimed is:

1. A printing press comprising:

at least one electric motor, the at least one electric motor being arranged at a distance of less than 0.5 meters from an emission source of solvent vapors, wherein the emission source is one or more of an anilox roller, a pressure cylinder, a chambered doctor blade bar, an ink tray, or an imprinted web of material; and at least one explosion protection wall, the at least one explosion protection wall enclosing the at least one electric motor on at least two sides of the at least one electric motor and having an opening on an opposite side of the at least one electric motor from the emission source;

wherein a thread measure through the opening and between the emission source and the at least one electric motor is greater than 0.5 meters, wherein the thread measure is a shortest free path connecting two points to each other while skirting obstacles.

2. The printing press of claim 1, wherein the at least one explosion protection wall is part of a labyrinth structure.

3. The printing press of claim 1, wherein the at least one explosion protection wall is part of a housing open at one end.

4. The printing press of claim 3, wherein the housing has the opening on a side of the at least one electric motor, the at least one electric motor facing away from the emission source.

5. The printing press of claim 1, wherein the emission source is the ink tray, which is designed to hold solvent-containing ink up to a maximum level, wherein the at least one electric motor is arranged relative to the ink tray such that a minimum thread measure between the maximum level and the at least one electric motor without the at least one explosion protection wall is less than 0.5 meters, and the at least one explosion protection wall is designed such that the minimum thread measure through the opening and between the maximum level and the at least one electric motor with the at least one explosion protection wall is greater than 0.5 meters.

6. The printing press of claim 1, wherein the emission source is the ink tray.

7. The printing press of claim 1, wherein the at least one electric motor does not have an explosion-protected design.

8. The printing press of claim 1, wherein the at least two sides include a top, a bottom, and a side between the top and the bottom, and the at least one explosion protection wall includes a top covering the top of the at least one electric motor, a bottom below the bottom of the at least one electric motor, and a side between the top and the bottom of the at least one explosion protection wall and adjacent the side of the at least one electric motor.

9. A printing press comprising:

an electric motor;

an ink tray that emits an ignitable composition, the ink tray provided at a same height as the electric motor in the printing press; and an explosion protection wall enclosing the electric motor on at least two sides of the electric motor and having an opening on an opposite side of the electric motor from the ink tray.

10. The printing press of claim 9, wherein a minimum thread measure between the ink tray and the electric motor is greater than 0.5 meters, wherein the minimum thread measure is a shortest free path through the opening and connecting the electric motor and the ink tray while avoiding obstacles.

11. The printing press of claim 9, wherein the explosion protection wall is cuboidal.

12. The printing press of claim 9, wherein the opening faces away from the ink tray.

13. The printing press of claim 9, wherein the explosion protection wall has a shape of an open shoe box.

14. The printing press of claim 9, wherein the explosion protection wall is collar-shaped in a circumferential direction of the electric motor to enclose the electric motor.

15. The printing press of claim 9, wherein the electric motor itself does not have an explosion-protected design.

16. The printing press of claim 9, wherein the electric motor is an adjustment drive unit of the printing press.

17. The printing press of claim 9, wherein the at least two sides include a top, a bottom, and a side between the top and the bottom, and the explosion protection wall includes a top covering the top of the electric motor, a bottom below the bottom of the electric motor, and a side between the top and the bottom of the explosion protection wall and adjacent the side of the electric motor.

18. A printing press comprising:

an electric motor;

an ink tray provided at a same height as the electric motor in the printing press; and an explosion protection wall between the ink tray and the electric motor, wherein the explosion protection wall encloses the electric motor on at least two sides of the electric motor and has an opening on an opposite side of the electric motor from the ink tray, and wherein a shortest unobstructed distance through the opening and connecting the electric motor and the ink tray is greater than 0.5 meters.

19. The printing press of claim 18, wherein the explosion protection wall further includes a top covering a top of the electric motor, a bottom below a bottom of the electric motor, and a side between the top and the bottom of the explosion protection wall and between the ink tray and the electric motor.

20. The printing press of claim 18, wherein the shortest unobstructed distance is greater than a shortest obstructed distance between the ink tray and the electric motor through the explosion protection wall.

* * * * *